United States Patent
Åström et al.

(10) Patent No.: US 11,828,837 B2
(45) Date of Patent: Nov. 28, 2023

(54) METHOD FOR IMPROVING RADAR MEASUREMENTS IN A HANDHELD DEVICE

(71) Applicant: Telefonaktiebolaget LM Ericsson (publ), Stockholm (SE)

(72) Inventors: Magnus Åström, Lund (SE); Bengt Lindoff, Bjärred (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 230 days.

(21) Appl. No.: 17/416,153

(22) PCT Filed: Dec. 21, 2018

(86) PCT No.: PCT/EP2018/086742
§ 371 (c)(1),
(2) Date: Jun. 18, 2021

(87) PCT Pub. No.: WO2020/126051
PCT Pub. Date: Jun. 25, 2020

(65) Prior Publication Data
US 2022/0075049 A1 Mar. 10, 2022

(51) Int. Cl.
*G01S 13/524* (2006.01)
*G01S 13/10* (2006.01)
*G01S 13/86* (2006.01)

(52) U.S. Cl.
CPC ........ *G01S 13/5242* (2013.01); *G01S 13/103* (2013.01); *G01S 13/867* (2013.01)

(58) Field of Classification Search
None
See application file for complete search history.

(56) References Cited

U.S. PATENT DOCUMENTS

| | | |
|---|---|---|
| 5,119,100 A | 6/1992 | Marini et al. |
| 7,898,455 B2 | 3/2011 | Rosenbury |

(Continued)

FOREIGN PATENT DOCUMENTS

| | | |
|---|---|---|
| CN | 106527672 A | 3/2017 |
| CN | 108089200 A | 5/2018 |

OTHER PUBLICATIONS

PCT International Search Report, dated Aug. 23, 2019, in connection with International Application No. PCT/EP2018/086742, all pages.

(Continued)

*Primary Examiner* — Whitney Moore
(74) *Attorney, Agent, or Firm* — LEFFLER INTELLECTUAL PROPERTY LAW, PLLC

(57) ABSTRACT

A device and method therein for improving measurement result made by a radar unit are disclosed. The device comprises the radar unit and at least one motion sensor unit. The radar unit transmits at least one radar pulse in a frequency range and receives at least one radar pulse response associated to reflections of the at least one transmitted radar pulse. The radar unit determines at least one measurement based on the transmitted and received radar pulses. The radar unit further receives information on movement of the device from the at least one motion sensor unit during radar pulse transmission and reception and adjust the at least one measurement based on received information on movement of the device from the at least one motion sensor unit.

19 Claims, 2 Drawing Sheets

(56) References Cited

U.S. PATENT DOCUMENTS

| 9,482,573 | B2 | 11/2016 | Peczalski et al. |
| 2008/0201033 | A1 | 8/2008 | DeMersseman et al. |
| 2011/0025545 | A1 | 2/2011 | Cook et al. |
| 2016/0077202 | A1 | 3/2016 | Hirvonen et al. |
| 2017/0303858 | A1 | 10/2017 | Barak et al. |
| 2019/0005812 | A1* | 1/2019 | Matus .................. G06V 20/584 |
| 2020/0226931 | A1* | 7/2020 | Caldwell ................ G08G 1/166 |

OTHER PUBLICATIONS

PCT Written Opinion, dated Aug. 23, 2019, in connection with International Application No. PCT/EP2018/086742, all pages.
Elliott Schires et al., "Vital Sign Monitoring Through the Back Using an UWB Impulse Radar with Body Coupled Antennas", IEEE Transactions on Biomedical Circuits and Systems, vol. 12, No. 2, Apr. 2018, pp. 292-302.
Isar Mostafanezhad et al., "Cancellation of Unwanted Doppler Radar Sensor Motion Using Empirical Mode Decomposition", IEEE Sensors Journal, vol. 13, No. 5, May 2013, pp. 1897-1904.
European Communication dated Mar. 17, 2023 in connection with European Application No. 18826736.3, 6 pages.

* cited by examiner

METHOD FOR IMPROVING RADAR MEASUREMENTS IN A HANDHELD DEVICE

TECHNICAL FIELD

Embodiments herein relate to a device and method therein. In particular, they relate to how to improve radar measurements in a handheld device comprising a radar sensor unit and at least one motion sensor unit in a wireless communication network.

BACKGROUND

Low power, low cost radar sensors have been developed and may be used in a number of new devices, such as cars for parking help, autonomous lawn-movers or vacuum cleaners to detect living objects in front of the lawn-movers or vacuum cleaners etc. Usually, 61 GHz Industrial, Scientific and Medical (ISM) band is used for such radar applications and allows for highly accurate distance measurements up to distances of tens of meters. In a near future it is expected that radar sensors will be integrated in mobile phones.

A mobile device such as a smartphone is an example of a device comprising multiple sensors, e.g., camera, microphone, radio antennae and motion sensors like, accelerators, gyroscope and Global Navigation Satellite System (GNSS) or Global Positioning System (GPS) receivers. Future smartphones or mobile devices may additionally be equipped with, e.g., radar sensors, allowing accurate measurements over short range, up to a couple of meters.

Sensor fusion is combining of sensory data or data derived from disparate sources such that the resulting information has less uncertainty than would be possible when these sources were used individually. The term uncertainty reduction in this case can mean more accurate, more complete, or more dependable.

The distance measurement accuracy of radar sensors operating in the 60 GHz band will be in the order or less than a mm on a distance of a few meters. This makes radar application very interesting in smartphone devices. With such a good accuracy, the uncertainty in the measurement may be dependent on how stable or stationary the measurement unit, i.e. the smartphone or handheld device is. A prior art solution to this problem is to measure for a long time and average out possible small variations.

However, such approach may only solve variations that are varying in a "stationary" way and hence slowly drift of the measurement device etc. may not be compensated for. Hence there is a need for method and apparatus for solving this issue.

SUMMARY

It is therefore an object of embodiments herein to provide a device and method therein for improving radar measurements in a handheld device.

According to one aspect of embodiments herein, the object is achieved by a device comprising a radar unit and at least one motion sensor unit. The radar unit is configured to transmit at least one radar pulse in a frequency range and receive at least one radar pulse response associated to reflections of the at least one transmitted radar pulse. The radar unit is configured to determine at least one measurement based on the transmitted and received radar pulses. The radar unit is further configured to receive information on movement of the device from the at least one motion sensor unit during radar pulse transmission and reception and adjust the at least one measurement based on received information on movement of the device from the at least one motion sensor unit.

According to one aspect of embodiments herein, the object is achieved by a method performed in a device comprising a radar unit and at least one motion sensor unit. The radar unit transmits at least one radar pulse in a first frequency range and receives at least one radar pulse response associated to reflections of the at least one transmitted radar pulse. The radar unit determines at least one measurement based on the transmitted and received radar pulses. The radar unit further receives information on movement of the device from the at least one motion sensor unit during radar pulse transmission and reception and adjust the at least one measurement based on received information on movement of the device from the at least one motion sensor unit.

In other words, the device and method therein according to embodiments herein utilize motion sensor information for compensating movement of a handheld device during radar pulse transmissions to improve accuracy of measurements made by a radar unit comprised in the handheld device.

BRIEF DESCRIPTION OF THE DRAWINGS

Examples of embodiments herein are described in more detail with reference to attached drawings in which.

DETAILED DESCRIPTION

Figure 1:
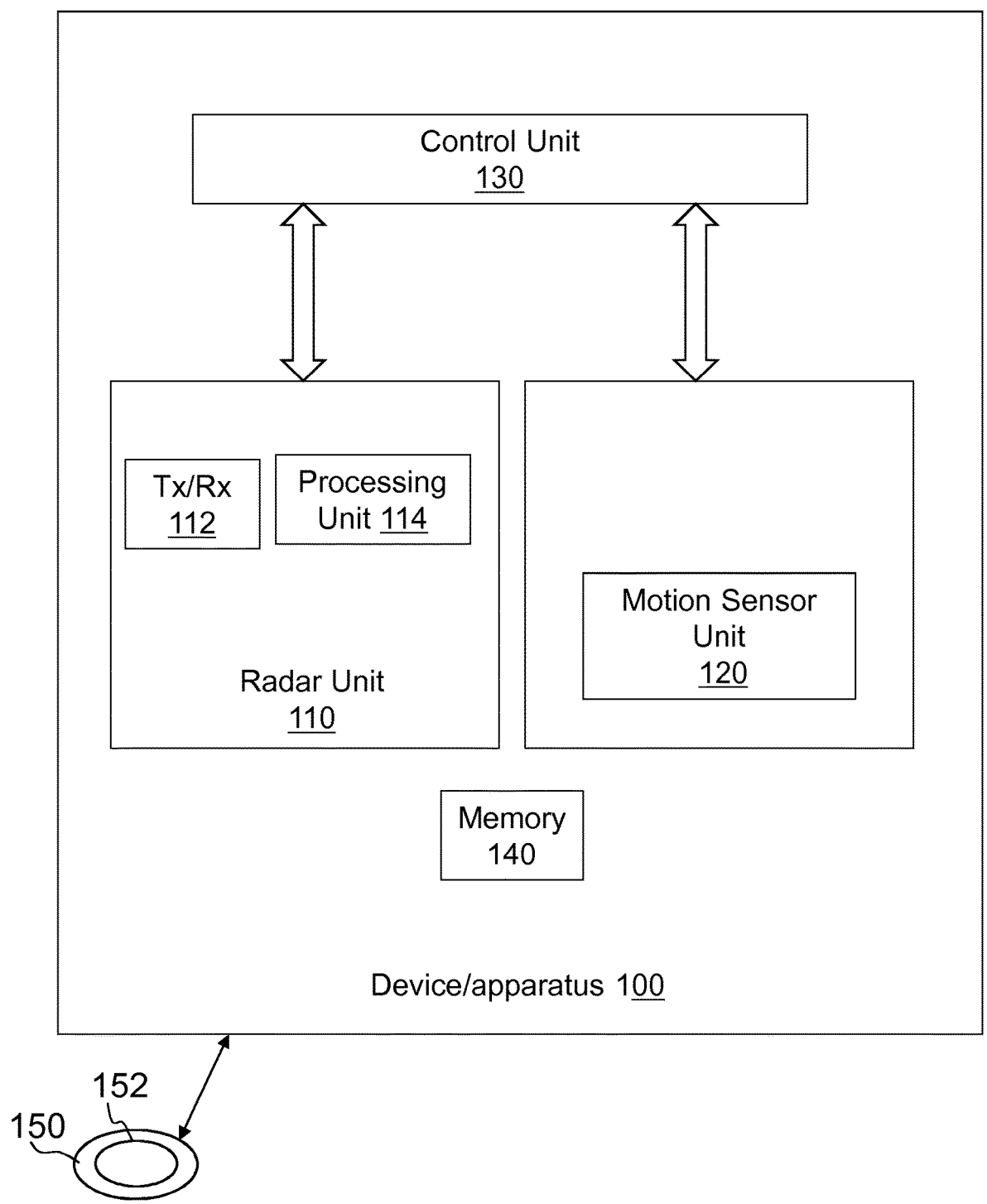
FIG. 1 is a schematic block diagram illustrating a device according to embodiments herein.

FIG. 1 depicts a block diagram of a device or apparatus 100 according to embodiments herein. The device 100 comprises a radar unit 110, at least one motion sensor unit 120 and a control unit 130. The control unit 130 enables communication between the radar unit 110 and motion sensor unit 120. The radar unit 110 comprises a transceiver Tx/Rx 112 and a processing unit 114 processing transmitted and received radar pulses to obtain measurement results. The at least one motion sensor unit 120 may be at least one of the following units comprised in the handheld device 100:

a. An accelerometer;
b. A Gyroscope;
c. A GNSS;
d. A Compass;
e. A Camera;
f. A wireless communication unit.

The device 100 may be any kind of handheld devices such as smartphones, wearable devices, Internet of Things (IoT) devices, eHealth devices, such as wireless heart or breath monitors etc.

According to the embodiments herein, the radar unit 110 is configured to, e.g. by means of the transceiver Tx/Rx 112 being configured to, transmit at least one radar pulse in a frequency range. The frequency range may be a frequency band, a system bandwidth, a bandwidth part (BWP) or a subset of respective of the three. For example, the at least one radar pulse may be transmitted in such as a 61 GHz ISM band, but may also be transmitted in other frequency bands, preferably, but not limited to, in mmW frequency bands, e.g. larger than 10 GHz.

The radar unit 110 is further configured to, e.g. by means of the transceiver Tx/Rx 112 being configured to, receive at least one radar pulse response associated to reflections of the at least one transmitted radar pulse. The radar unit 110 is configured to determine at least one measurement based on the transmitted and received radar pulses.

In order to compensate possible movement of the handheld device 100 to improve accuracy of measurements made by the radar unit 110, the radar unit 110 is further configured to receive information on movement of the device 100 from the at least one motion sensor unit 120 during radar pulse transmission and reception. The information on movement of the device 100 may either be two sets of coordinates or a vector presenting positional difference between two time instants.

The radar unit 110 is further configured to adjust the at least one measurement based on received information on movement of the device from the at least one motion sensor unit. The determination and adjustment of at least one measurement may be performed in the processing unit 114 in the radar unit 110 or in the control unit 130. The radar unit 110 may determine a measurement result from the transmitted and received radar pulses. This measurement result may be inaccurate due to movement of the device 100.

The information from the motion sensor unit 120 may therefore be used for applying a compensation term, e.g. a scaling or biasing factor, to the measurement determined by the radar unit 100 without take into account the movement of the device 100. The compensation term is associated to the movement of the device 100. For example, if a vector presenting positional difference between two time instants is given, the component of the vector that is directed in the measurement direction is either subtracted or added to the measurement. If the vector is derived over a different period of time compared to the measurements, the subtracted value may be compensated accordingly, i.e., multiplied with a scaling factor.

There are several ways to improve the accuracy of the measurement:

According to some embodiments herein, averaging multiple measurements over multiple radar pulses may be performed when determining and adjusting the at least one measurement.

According to some embodiments herein, averaging motion information over a time period for multiple radar pulse transmissions and receptions may be performed when determining and adjusting the at least one measurement.

According to sensor fusion techniques, the more samples, the more accurate the estimate. So according to some embodiments herein, motion information from multiple motion sensor units may be used when determining and adjusting the at least one measurement to reduce error. In such a case, e.g., a camera may be used to accurately model and determine a movement in the X and Y dimensions thereby allowing for a decreased uncertainty or variance in the Z dimension from another sensor. By using a second, better sensor e.g. the camera in the X-Y plane, the remaining uncertainty is reduced to the Z dimension. The uncertainty is thereby reduced to one dimension instead of three if the camera weren't used.

An accelerometer is measuring accelerations in one or more directions, thereby being able to determine movement. This may be done, e.g., by using Earth's magnetic field for determining quite small changes resulting from movement. A gyroscope is a rotation sensor, by using inertia, typically rotating wheels with high mass to measure or maintain orientation and angular velocity. Three-axis Microelectromechanical systems (MEMS) based gyroscopes are also being used in portable electronic devices such as tablets, smartphones and smartwatches. The MEMS based gyroscopes provide 6 degrees motion sensing allowed for more accurate recognition of movement within a 3D space: acceleration for X, Y and Z movement, and gyroscopes for orientation and rotation. The satellite navigation or satnav system, such as GNSS, GPS, GLONASS, BeiDou, Galileo, use satellites to determine position and movement. Any one or a combination of these sensor units may be used to provide information on movement of the device 100.

A wireless communication unit may be used as a motion sensor. In this case, the motion may be determined from, for instance radio channel estimates performed in a channel estimation unit in a baseband processor. Typically the radio channel is estimated on a regular basis, e.g. every slot or subframe per n:th orthogonal frequency-division multiplexing (OFDM) symbol, etc. depending on radio access technology. Variations of the radio channels may be used to determine motion of the device. There are many ways to do it. Triangulation of time differences between base stations is one, estimating an impulse response and its changes is another. By using an estimated channel model, it is possible to derive a "most likely movement" between two channel model estimates. The precision of radio channel based positioning depends on methods used. For example, if combined with some other information, e.g., a map of the surroundings, it is possible to estimate angles of incidence rays, i.e. impulses in an impulse response. So it is possible to estimate the channel impulse response, and estimate a "most likely" position change based on impulse response changes. The movement of the device 100 may be determined from the position change.

The measurement may be a distance measurement of a distance between the device 100 and an object. The radar unit 110 makes a distance measurement based on the transmitted and received radar pulses. To improve an accuracy of the distance measurement, the information from the motion sensor unit 120 may be used for applying a compensation term, e.g. a scaling or biasing factor, to the distance measurement.

According to some embodiments herein, the radar unit 110 may be further configured to determine an uncertainty of the distance measurement based on received information on movement of the device.

The distance measurement result, including uncertainty in the measurement, may be displayed on a display associated to the device 100. Furthermore, the uncertainty may be determined and displayed also for:

Uncertainty due to radar measurement only;
Uncertainty due to radar measurement and motion information, which will give a smaller uncertainty than the uncertainty due to radar measurement only.

The uncertainty of the measurement may be in a confidence interval standard deviation or variance for instance.

According to some embodiments herein, the radar unit 110 may further be configured to adjust the received information on movement of the device based on a direction of the distance measurement, and determine and adjust the distance measurement based on the adjusted information on movement of the device. It is the movement of the device 100 that occurs in the same dimension as the distance measurement that mainly matters. Therefore, for example, the result from the motion sensor, typically derived in the X, Y and Z dimensions according to the placement of the motion sensor, is recomputed in the direction of the distance measurement, resulting in an even more accurate estimate of the movement The device and method therein according to embodiments herein may be used in commercial applications for example where it is desired to detect dynamic events changing over time, particularly periodic movements as vibrations and oscillations. In these cases, the exact relative distance between the device and an object or target is not interesting, but the motion pattern of the object. From the motion pattern of the object, one may determine amplitude and frequency of a dynamic event. For example, one may want to determine the amplitude and/or frequency of an oscillation or vibrations. From a series of distance measurements measured during a time period, it is possible to determine the amplitude and/or frequency of vibrations or oscillations. For example, one may measure distances of two end points of an oscillation. From a time series of such distances, i.e. variations between the two end points, it is possible to determine the frequency of the vibrations and oscillations. From a difference of the two distances, it is possible to determine the amplitude of the vibrations and oscillations.

In medical field, one may mention pulse and respiration measurements in a body. The handheld device is aimed at a spot of the body and involuntary movement of the handheld device is balanced out, i.e. the inaccuracy in the measuring device from it being handheld is cancelled. Thus, the accuracy will be sufficient to measure an expansion and a retraction of a blood vessel to measure the pulse. At another part of the body, the breathing rate may be measured.

In mechanical field, e.g., measurements of wheel skew or construction vibrations in rails, machine, bridges or buildings may be mentioned.

Therefore, according to some embodiments herein, the at least one measurement may be a vibration measurement determined based on a distance measurement between the device and an object.

The vibration measurement may be any one of a pulse or a respiration in a body.

The vibration measurement may be any one of a wheel skew or a construction vibration in a rail, machine, bridge or building.

According to some embodiments herein, the radar unit 110 may be further configured to form a hypothesis regarding the measured distance based on a set of measured distances. For example, if a measurement is pulse, a hypothesis may be formed whether distance A or distance B was received. If a heartbeat is manifested as a 1 mm expansion of a blood vessel, a hypothesis may be formed as an average distance+/−½ mm.

Figure 2:
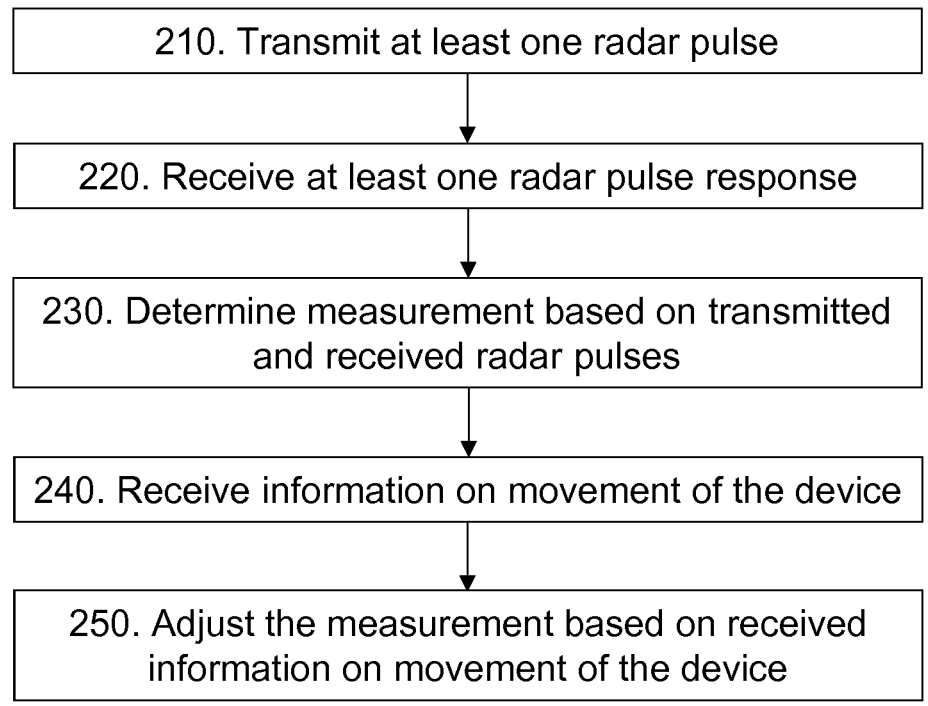
FIG. 2 is a flow chart illustrating a method performed in a device according to embodiments herein.

Example of embodiments of a method performed in a device 100 for improving measurements made by a radar unit 110 comprised in the device 100 will now be described with reference to FIG. 2. The device 100 comprises a radar unit 110 and at least one motion sensor unit 120. The method comprises the following actions.

Action 210

The radar unit 110 transmits at least one radar pulse in a frequency range.

Action 220

The radar unit 110 receives at least one radar pulse response associated to reflections of the at least one transmitted radar pulse.

Action 230

The radar unit 110 determines at least one measurement based on the transmitted and received radar pulses.

Action 240

The radar unit 110 receives information on movement of the device from the at least one motion sensor unit 120 during radar pulse transmission and reception.

Action 250

The radar unit 110 adjusts the at least one measurement based on received information on movement of the device 100 from the at least one motion sensor unit 120.

According to some embodiments herein, the radar unit 110 may apply a compensation term associated to the movement of the device when determining and adjusting the at least one measurement.

According to some embodiments herein, the radar unit 110 may average multiple measurements when determining and adjusting the at least one measurement.

According to some embodiments herein, the radar unit 110 may average motion information over a period of time for multiple radar pulse transmissions and receptions when determining and adjusting the at least one measurement.

According to some embodiments herein, the radar unit 110 may use motion information from multiple motion sensor units when determining and adjusting the at least one measurement.

According to some embodiments herein, the at least one measurement may be at least one distance measurement between the device and an object. The radar unit 110 makes a distance measurement based on the transmitted and received radar pulses without considering the movement of the device 100. To improve an accuracy of the distance measurement, the information from the motion sensor unit 120 may be used for applying a compensation term, e.g. a scaling or biasing factor, to the distance measurement. The radar unit 110 may further adjust the received information on movement of the device based on a direction of the distance measurement, and determines and adjusts the distance measurement based on the adjusted information on movement of the device.

According to some embodiments herein, the at least one measurement may be a vibration measurement determined based on a distance measurement between the device and an object. The vibration measurement may be any one of a pulse or a respiration in a body, a wheel skew or a construction vibration in a rail, machine, bridge or building.

To summarize, the device 100 and method therein according to the embodiments herein utilize motion sensor information for compensating movement of a handheld device during radar pulse transmissions to improve accuracy of measurements made by a radar unit comprised in the handheld device. By applying a compensation term associated to the movement of the device, the movement of the device can be cancelled out in the measurement and thereby improving the accuracy of the measurement. By averaging multiple measurements or averaging motion information over a period of time, uncertainty in the measurement may be reduced. By using motion information from multiple motion sensor units, errors in the measurement may be further reduced. Further, by adjusting the received information on movement of the device based on a direction of the measurement, an even more accurate estimate of the movement may be obtained and the measurement accuracy will be improved further. For measurements, such as measurements of periodic or dynamic events, for which it is not suitable to use averaging to improve accuracy since averaging may reduce the dynamics in the averaged measurement, fewer measurements will be faster and desirable. Then applying a compensation term associated to the movement of the device will improve the accuracy.

Those skilled in the art will appreciate that the control unit 130, the processing unit 114 in the radar unit 110 described above in the device 100 may be referred to one circuit/unit, a combination of analog and digital circuits, one or more processors configured with software and/or firmware and/or any other digital hardware performing the function of each circuit/unit. The device 100 may comprises other circuit/units, such as one or more memory units 140 and may be arranged to be used to store received information, measurements, data, configurations and applications to perform the method herein when being executed in the device 100.

The embodiments herein for improving measurements made by a radar unit 110 may be implemented through one or more processors, such as the processing unit 114 or the control unit 130 in the device 100 together with computer program code for performing the functions and actions of the embodiments herein. The program code mentioned above may also be provided as a computer program product, for instance in the form of a data carrier 150 carrying computer program code 152, as shown in FIG. 1, for performing the embodiments herein when being loaded into the device 100. One such carrier may be in the form of a CD ROM disc. It is however feasible with other data carriers such as a memory stick. The computer program code may furthermore be provided as pure program code on a server or a cloud and downloaded to the device 100.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A device comprising a radar unit and at least one motion sensor unit, wherein the radar unit is configured to:
   transmit at least one radar pulse in a frequency range;
   receive at least one radar pulse response associated to reflections of the at least one transmitted radar pulse;
   determine at least one measurement based on the transmitted and received radar pulses;
   receive information on movement of the device from the at least one motion sensor unit during radar pulse transmission and reception; and
   adjust the at least one measurement based on received information on movement of the device from the at least one motion sensor unit,
   wherein the at least one measurement is at least one distance measurement between the device and an object, and
   wherein the radar unit is further configured to adjust the received information on movement of the device based on a direction of the distance measurement, and determine and adjust the distance measurement based on the adjusted information on movement of the device.

2. The device according to claim 1, wherein the radar unit is configured to apply a compensation term associated to the movement of the device when adjusting the at least one measurement.

3. The device according to claim 2, wherein the radar unit is configured to use motion information from multiple motion sensor units when determining and adjusting the at least one measurement.

4. The device according to claim 1, wherein the radar unit is configured to average multiple measurements when determining and adjusting the at least one measurement.

5. The device according to claim 1, wherein the radar unit is configured to average motion information over a period of time for multiple radar pulse transmissions and receptions when determining and adjusting the at least one measurement.

6. The device according to claim 1, wherein the radar unit is further configured to determine an uncertainty of the distance measurement based on received information on movement of the device.

7. The device according to claim 1, wherein the at least one measurement is a vibration measurement determined based on a distance measurement between the device and an object.

8. The device according to claim 7, wherein the vibration measurement is any one of a pulse or a respiration in a body.

9. The device according to claim 7, wherein the vibration measurement is any one of a wheel skew or a construction vibration in a rail, machine, bridge or building.

10. The device according to claim 1, wherein the radar unit is further configured to form a hypothesis regarding the measured distance based on a set of measured distances.

11. The device according to claim 1, wherein the motion sensor unit is at least one of
   a. an accelerometer
   b. a gyroscope;
   c. a GNSS;
   d. a compass;
   e. a camera; and
   f. a wireless communication unit.

12. The device according to claim 1, wherein the device is any one of a handheld device, a smartphone or a wearable device, comprising a radar unit and at least one motion sensor unit.

13. A method performed in a device comprising a radar unit and at least one motion sensor unit, the method comprising:
   transmitting at least one radar pulse in a frequency range;
   receiving at least one radar pulse response associated to reflections of the at least one transmitted radar pulse;
   determining at least one measurement based on the transmitted and received radar pulses;
   receiving information on movement of the device from the at least one motion sensor unit during radar pulse transmission and reception; and
   adjusting the at least one measurement based on received information on movement of the device from the at least one motion sensor unit,
   wherein the at least one measurement is at least one distance measurement between the device and an object, and
   wherein the method further comprises adjusting the received information on movement of the device based on a direction of the distance measurement, and determining and adjusting the distance measurement based on the adjusted information on movement of the device.

14. The method according to claim 13, wherein adjusting the at least one measurement comprises applying a compensation term associated to the movement of the device to the measurement made by the radar unit.

15. The method according to claim 13, wherein determining and adjusting the at least one measurement comprises averaging multiple measurements made by the radar unit.

16. The method according to claim 13, wherein determining and adjusting the at least one measurement comprises averaging motion information over a period of time for multiple radar pulse transmissions and receptions.

17. The method according to claim 13, wherein determining and adjusting the at least one measurement comprises using motion information from multiple motion sensor units.

18. The method according to claim 13, wherein the at least one measurement is a vibration measurement determined based on a distance measurement between the device and an object.

19. The method according to claim 18, wherein the vibration measurement is any one of a pulse or a respiration in a body, a wheel skew or a construction vibration in a rail, machine, bridge or building.

* * * * *